United States Patent
Julian et al.

(10) Patent No.: US 8,238,923 B2
(45) Date of Patent: Aug. 7, 2012

(54) METHOD OF USING SHARED RESOURCES IN A COMMUNICATION SYSTEM

(75) Inventors: David Jonathan Julian, San Diego, CA (US); Avneesh Agrawal, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 996 days.

(21) Appl. No.: 11/022,143

(22) Filed: Dec. 22, 2004

(65) Prior Publication Data
US 2006/0153239 A1  Jul. 13, 2006

(51) Int. Cl.
*H04W 72/00* (2009.01)

(52) U.S. Cl. ............ 455/450; 455/451; 455/452.1; 455/452.2; 455/466; 455/518; 370/329; 370/341; 370/342; 370/412; 370/431

(58) Field of Classification Search .......... 455/450, 455/452.1, 452.2, 453, 518, 519, 451, 458, 455/466; 370/328, 329, 330, 341, 312, 432, 370/473, 474, 252, 253, 389, 412, 436, 437, 370/335, 342, 431, 465, 466, 467
See application file for complete search history.

(56) References Cited

U.S. PATENT DOCUMENTS

| | | | |
|---|---|---|---|
| 4,346,473 A | 8/1982 | Davis | |
| 4,617,657 A | 10/1986 | Drynan et al. | |
| 4,850,036 A | 7/1989 | Smith | |
| 5,282,222 A | 1/1994 | Fattouche et al. | |
| 5,408,496 A | 4/1995 | Ritz et al. | |
| 5,416,780 A | 5/1995 | Patel et al. | |
| 5,511,233 A | 4/1996 | Otten et al. | |
| 5,519,130 A | 5/1996 | Byrom et al. | |
| 5,519,730 A | 5/1996 | Jasper et al. | |
| 5,694,389 A | 12/1997 | Seki et al. | |
| 5,732,351 A | 3/1998 | Olds et al. | |
| 5,822,700 A * | 10/1998 | Hult et al. | 455/466 |
| 5,867,478 A | 2/1999 | Baum et al. | |
| 5,889,759 A | 3/1999 | McGibney | |
| 5,920,547 A * | 7/1999 | Werth | 370/280 |

(Continued)

FOREIGN PATENT DOCUMENTS

CN  1254223 A  5/2000

(Continued)

OTHER PUBLICATIONS

Sudarshan Rao, Subramanian Vasudevan, Resource Allocation and Fairness for Downlink Shared Data Channels, Mar. 16-20, 2003, 2003 IEEE. Wireless Communications and Networking, 2003. WCNC 2003, pp. 1049-1054.*

(Continued)

*Primary Examiner* — Olumide T Ajibade Akonai
(74) *Attorney, Agent, or Firm* — Donald C. Kordich

(57) ABSTRACT

An apparatus and method of delivering data in a wireless communication system, the apparatus and method comprising of determining, based on first criteria, if a shared channel can utilized to transmit an actual data packet; converting said actual data packet into one or more first data packets, wherein each said one or more first data packet represent a portion of said actual data packet; and transmitting each said one or more first data packet using said shared channel.

22 Claims, 6 Drawing Sheets

U.S. PATENT DOCUMENTS

| | | | |
|---|---|---|---|
| 5,995,494 A | 11/1999 | Horikawa et al. | |
| 6,005,852 A | 12/1999 | Kokko et al. | |
| 6,021,124 A | 2/2000 | Haartsen et al. | |
| 6,052,377 A | 4/2000 | Ohmi et al. | |
| 6,104,926 A | 8/2000 | Hogg et al. | |
| 6,105,064 A | 8/2000 | Davis et al. | |
| 6,134,434 A | 10/2000 | Krishnamurthi et al. | |
| 6,141,550 A * | 10/2000 | Ayabe et al. | 455/433 |
| 6,157,839 A * | 12/2000 | Cerwall et al. | 455/450 |
| 6,172,971 B1 | 1/2001 | Kim | |
| 6,173,016 B1 | 1/2001 | Suzuki | |
| 6,188,717 B1 | 2/2001 | Kaiser et al. | |
| 6,285,665 B1 | 9/2001 | Chuah | |
| 6,333,937 B1 | 12/2001 | Ryan et al. | |
| 6,347,091 B1 * | 2/2002 | Wallentin et al. | 370/437 |
| 6,367,045 B1 | 4/2002 | Khan et al. | |
| 6,369,758 B1 | 4/2002 | Zhang et al. | |
| 6,377,587 B1 | 4/2002 | Grivna | |
| 6,377,809 B1 * | 4/2002 | Rezaiifar et al. | 455/455 |
| 6,430,412 B1 | 8/2002 | Hogg et al. | |
| 6,430,724 B1 | 8/2002 | Laneman et al. | |
| 6,447,210 B1 | 9/2002 | Coombs et al. | |
| 6,449,245 B1 | 9/2002 | Ikeda et al. | |
| 6,466,591 B1 | 10/2002 | See et al. | |
| 6,473,393 B1 | 10/2002 | Ariyavisitakul et al. | |
| 6,473,467 B1 | 10/2002 | Wallace et al. | |
| 6,477,210 B2 | 11/2002 | Chuang et al. | |
| 6,487,235 B2 | 11/2002 | Hoole et al. | |
| 6,487,252 B1 | 11/2002 | Kleider et al. | |
| 6,505,253 B1 | 1/2003 | Chiu et al. | |
| 6,515,997 B1 | 2/2003 | Feltner et al. | |
| 6,522,886 B1 * | 2/2003 | Youngs et al. | 455/450 |
| 6,532,227 B1 | 3/2003 | Leppisaari et al. | |
| 6,532,256 B2 | 3/2003 | Miller et al. | |
| 6,535,715 B2 | 3/2003 | Dapper et al. | |
| 6,545,997 B1 | 4/2003 | Bohnke et al. | |
| 6,549,561 B2 | 4/2003 | Crawford et al. | |
| 6,563,858 B1 | 5/2003 | Fakatselis et al. | |
| 6,567,374 B1 | 5/2003 | Bohnke et al. | |
| 6,567,397 B1 | 5/2003 | Campana, Jr. et al. | |
| 6,594,320 B1 | 7/2003 | Sayeed et al. | |
| 6,597,680 B1 | 7/2003 | Lindskog et al. | |
| 6,597,745 B1 | 7/2003 | Dowling et al. | |
| 6,597,918 B1 * | 7/2003 | Kim | 455/466 |
| 6,601,207 B1 | 7/2003 | Vanttinen et al. | |
| 6,603,801 B1 | 8/2003 | Andren et al. | |
| 6,618,454 B1 | 9/2003 | Agrawal et al. | |
| 6,633,616 B2 | 10/2003 | Crawford et al. | |
| 6,636,568 B2 | 10/2003 | Kadous et al. | |
| 6,643,281 B1 | 11/2003 | Ryan et al. | |
| 6,654,429 B1 | 11/2003 | Li et al. | |
| 6,658,619 B1 | 12/2003 | Chen et al. | |
| 6,661,832 B1 | 12/2003 | Sindhushayana et al. | |
| 6,674,792 B1 | 1/2004 | Sugita et al. | |
| 6,697,347 B2 * | 2/2004 | Ostman et al. | 370/335 |
| 6,700,865 B1 | 3/2004 | Yamamoto et al. | |
| 6,724,813 B1 | 4/2004 | Jamal et al. | |
| 6,731,614 B1 | 5/2004 | Ohlson et al. | |
| 6,741,634 B1 | 5/2004 | Kim et al. | |
| 6,751,187 B2 | 6/2004 | Walton et al. | |
| 6,801,564 B2 | 10/2004 | Rouphael et al. | |
| 6,813,478 B2 | 11/2004 | Glazko et al. | |
| 6,876,694 B2 | 4/2005 | Komatsu et al. | |
| 6,878,694 B2 | 4/2005 | Doshi et al. | |
| 6,885,645 B2 | 4/2005 | Ryan et al. | |
| 6,888,805 B2 | 5/2005 | Bender et al. | |
| 6,907,246 B2 | 6/2005 | Xu et al. | |
| 6,909,761 B2 | 6/2005 | Kloos et al. | |
| 6,928,062 B2 | 8/2005 | Krishnan et al. | |
| 6,928,065 B2 | 8/2005 | Logalbo et al. | |
| 6,975,647 B2 | 12/2005 | Neale et al. | |
| 6,977,974 B1 | 12/2005 | Geraniotis et al. | |
| 6,990,142 B2 | 1/2006 | Chappaz et al. | |
| 6,996,195 B2 | 2/2006 | Kadous et al. | |
| 6,996,401 B2 | 2/2006 | Agin | |
| 7,009,960 B2 | 3/2006 | Ho et al. | |
| 7,020,110 B2 | 3/2006 | Walton et al. | |
| 7,027,429 B2 | 4/2006 | Laroia et al. | |
| 7,027,523 B2 | 4/2006 | Jalali et al. | |
| 7,039,001 B2 | 5/2006 | Krishnan et al. | |
| 7,039,004 B2 | 5/2006 | Sun et al. | |
| 7,042,429 B2 | 5/2006 | Miyazawa et al. | |
| 7,042,857 B2 | 5/2006 | Krishnan et al. | |
| 7,046,651 B2 | 5/2006 | Terry et al. | |
| 7,054,902 B2 | 5/2006 | Toporek et al. | |
| 7,058,134 B2 | 6/2006 | Sampath et al. | |
| 7,061,915 B2 * | 6/2006 | Seidel et al. | 370/394 |
| 7,062,276 B2 | 6/2006 | Xu et al. | |
| 7,068,703 B2 | 6/2006 | Maric et al. | |
| 7,072,413 B2 | 7/2006 | Walton et al. | |
| 7,089,024 B2 * | 8/2006 | Kim et al. | 455/466 |
| 7,092,459 B2 | 8/2006 | Sendonaris et al. | |
| 7,099,296 B2 | 8/2006 | Belcea | |
| 7,099,299 B2 | 8/2006 | Liang et al. | |
| 7,099,622 B2 * | 8/2006 | Meyer et al. | 455/11.1 |
| 7,103,823 B2 | 9/2006 | Nemawarkar et al. | |
| 7,127,012 B2 | 10/2006 | Han et al. | |
| 7,133,460 B2 | 11/2006 | Bae et al. | |
| 7,139,320 B1 | 11/2006 | Singh et al. | |
| 7,177,297 B2 | 2/2007 | Agrawal et al. | |
| 7,181,170 B2 | 2/2007 | Love et al. | |
| 7,181,666 B2 | 2/2007 | Grob et al. | |
| 7,254,158 B2 | 8/2007 | Agrawal et al. | |
| 7,280,467 B2 | 10/2007 | Smee et al. | |
| 7,283,559 B2 | 10/2007 | Cho et al. | |
| 7,310,336 B2 * | 12/2007 | Malkamaki | 370/392 |
| 7,320,043 B2 | 1/2008 | Shatas et al. | |
| 7,366,272 B2 | 4/2008 | Kim et al. | |
| 7,376,422 B2 * | 5/2008 | Yagihashi | 455/434 |
| 7,411,895 B2 | 8/2008 | Laroia et al. | |
| 7,430,253 B2 | 9/2008 | Olson et al. | |
| 7,450,587 B2 * | 11/2008 | Gruhn et al. | 370/394 |
| 7,453,849 B2 | 11/2008 | Teague et al. | |
| 7,463,576 B2 | 12/2008 | Krishnan et al. | |
| 7,464,166 B2 | 12/2008 | Larsson et al. | |
| 7,474,686 B2 | 1/2009 | Ho et al. | |
| 7,519,016 B2 * | 4/2009 | Lee et al. | 370/318 |
| 7,551,546 B2 | 6/2009 | Ma et al. | |
| 7,630,403 B2 | 12/2009 | Ho et al. | |
| 7,631,247 B2 * | 12/2009 | Petrovic et al. | 714/776 |
| 7,778,337 B2 | 8/2010 | Tong et al. | |
| 2002/0034161 A1 | 3/2002 | Deneire et al. | |
| 2002/0034172 A1 | 3/2002 | Ho et al. | |
| 2002/0041635 A1 | 4/2002 | Ma et al. | |
| 2002/0044540 A1 | 4/2002 | Mottier et al. | |
| 2002/0080902 A1 | 6/2002 | Kim et al. | |
| 2002/0097697 A1 | 7/2002 | Bae et al. | |
| 2002/0119784 A1 | 8/2002 | Agin | |
| 2002/0122431 A1 | 9/2002 | Cho et al. | |
| 2002/0136273 A1 | 9/2002 | Hoole et al. | |
| 2002/0145968 A1 | 10/2002 | Zhang et al. | |
| 2002/0145970 A1 | 10/2002 | Han et al. | |
| 2002/0160781 A1 * | 10/2002 | Bark et al. | 455/450 |
| 2002/0196731 A1 | 12/2002 | Laroia et al. | |
| 2003/0012174 A1 | 1/2003 | Bender et al. | |
| 2003/0079022 A1 | 4/2003 | Toporek et al. | |
| 2003/0123481 A1 | 7/2003 | Neale et al. | |
| 2003/0135640 A1 | 7/2003 | Ho et al. | |
| 2003/0161343 A1 * | 8/2003 | Ghosh | 370/465 |
| 2003/0169769 A1 | 9/2003 | Ho et al. | |
| 2003/0174662 A1 | 9/2003 | Malkamaki et al. | |
| 2003/0214930 A1 | 11/2003 | Fischer | |
| 2003/0227898 A1 | 12/2003 | Logalbo et al. | |
| 2003/0228865 A1 * | 12/2003 | Terry | 455/422.1 |
| 2004/0001429 A1 | 1/2004 | Ma et al. | |
| 2004/0047298 A1 | 3/2004 | Yook et al. | |
| 2004/0062206 A1 | 4/2004 | Soong et al. | |
| 2004/0082336 A1 * | 4/2004 | Jami et al. | 455/450 |
| 2004/0082356 A1 | 4/2004 | Walton et al. | |
| 2004/0095903 A1 | 5/2004 | Ryan et al. | |
| 2004/0114552 A1 | 6/2004 | Lim et al. | |
| 2004/0116125 A1 * | 6/2004 | Terry | 455/450 |
| 2004/0118267 A1 | 6/2004 | Harrison | |
| 2004/0120304 A1 | 6/2004 | Kloos et al. | |
| 2004/0136445 A1 | 7/2004 | Olson et al. | |
| 2004/0137863 A1 | 7/2004 | Walton et al. | |
| 2004/0137943 A1 | 7/2004 | Tseng et al. | |

| | | | | | | |
|---|---|---|---|---|---|---|
| 2004/0170439 A1 | 9/2004 | Hiironen et al. | | JP | 2003060645 A | 2/2003 |
| 2004/0184471 A1* | 9/2004 | Chuah et al. ............... 370/420 | | JP | 2003060655 | 2/2003 |
| 2004/0196871 A1 | 10/2004 | Terry et al. | | JP | 2003078565 | 3/2003 |
| 2004/0213278 A1 | 10/2004 | Pullen et al. | | JP | 2003218826 A | 7/2003 |
| 2004/0235472 A1 | 11/2004 | Fujishima et al. | | JP | 2003520499 T | 7/2003 |
| 2004/0253968 A1 | 12/2004 | Chang et al. | | JP | 2004007353 A | 1/2004 |
| 2005/0002369 A1 | 1/2005 | Ro et al. | | JP | 2004159345 A | 6/2004 |
| 2005/0030976 A1 | 2/2005 | Wentink et al. | | JP | 2004312291 A | 11/2004 |
| 2005/0034049 A1 | 2/2005 | Nemawarkar et al. | | JP | 2005508103 T | 3/2005 |
| 2005/0044439 A1 | 2/2005 | Shatas et al. | | JP | 2005512458 T | 4/2005 |
| 2005/0163194 A1 | 7/2005 | Gore et al. | | JP | 2005536103 T | 11/2005 |
| 2005/0165949 A1 | 7/2005 | Teague et al. | | JP | 2006505229 T | 2/2006 |
| 2005/0174931 A1 | 8/2005 | Krishnamoorthi | | KR | 030017401 A | 3/2003 |
| 2005/0190868 A1 | 9/2005 | Khandekar et al. | | RU | 2111619 | 5/1998 |
| 2005/0202784 A1 | 9/2005 | Xu et al. | | RU | 2150174 C1 | 5/2000 |
| 2005/0272432 A1 | 12/2005 | Ji et al. | | RU | 2180159 C2 | 2/2002 |
| 2005/0281242 A1 | 12/2005 | Sutivong et al. | | RU | 2335852 C2 | 10/2008 |
| 2005/0281290 A1 | 12/2005 | Khandekar et al. | | TW | 508922 | 11/2002 |
| 2006/0045001 A1 | 3/2006 | Jalali | | WO | WO9210890 | 6/1992 |
| 2006/0114848 A1 | 6/2006 | Eberle et al. | | WO | WO9408432 A1 | 4/1994 |
| 2006/0133308 A1* | 6/2006 | Madan ............... 370/328 | | WO | WO9730526 A1 | 8/1997 |
| 2006/0133522 A1 | 6/2006 | Sutivong et al. | | WO | WO9814026 | 4/1998 |
| 2006/0203932 A1 | 9/2006 | Palanki et al. | | WO | WO9914878 | 3/1999 |
| 2006/0209927 A1 | 9/2006 | Khandekar et al. | | WO | WO9943114 A1 | 8/1999 |
| 2006/0218302 A1 | 9/2006 | Chia et al. | | WO | WO9944316 A1 | 9/1999 |
| 2006/0221810 A1 | 10/2006 | Vrcelj et al. | | WO | WO9966748 A1 | 12/1999 |
| 2006/0279435 A1 | 12/2006 | Krishnan et al. | | WO | WO0161902 A1 | 8/2001 |
| 2007/0206623 A1 | 9/2007 | Tiedemann, Jr. et al. | | WO | WO0176110 A2 | 10/2001 |
| 2007/0211790 A1 | 9/2007 | Agrawal et al. | | WO | WO0203556 A2 | 1/2002 |
| 2008/0075184 A1 | 3/2008 | Muharemovic et al. | | WO | WO0237887 A1 | 5/2002 |
| 2008/0137603 A1 | 6/2008 | Teague et al. | | WO | WO0241548 A1 | 5/2002 |
| 2008/0137652 A1* | 6/2008 | Herrmann et al. ............ 370/389 | | WO | WO0249305 A2 | 6/2002 |
| 2009/0245421 A1 | 10/2009 | Montojo et al. | | WO | WO0249306 A2 | 6/2002 |
| 2010/0002570 A9 | 1/2010 | Walton et al. | | WO | WO03019852 A1 | 3/2003 |
| 2010/0034164 A1 | 2/2010 | Ho et al. | | WO | WO03021829 A1 | 3/2003 |
| 2010/0182911 A1 | 7/2010 | Pullen et al. | | WO | WO03034645 | 4/2003 |
| 2011/0064039 A1 | 3/2011 | Sutivong et al. | | WO | WO2004015946 A1 | 2/2004 |
| 2011/0145584 A1 | 6/2011 | Coburn et al. | | WO | WO2004040813 A1 | 5/2004 |
| 2011/0235685 A1 | 9/2011 | Sutivong et al. | | WO | WO 2004/073219 A1 | 8/2004 |
| 2012/0087336 A1 | 4/2012 | Sutivong et al. | | WO | WO2004079937 A2 | 9/2004 |
| | | | | WO | WO 2005/074184 A2 | 8/2005 |
| | | | | WO | WO2006022876 A1 | 3/2006 |

FOREIGN PATENT DOCUMENTS

| | | |
|---|---|---|
| CN | 1345518 A | 4/2002 |
| CN | 1394394 A | 1/2003 |
| DE | 19701011 C1 | 6/1998 |
| DE | 19747369 A1 | 5/1999 |
| EP | 0658028 A2 | 6/1995 |
| EP | 0768806 A2 | 4/1997 |
| EP | 0917316 A2 | 5/1999 |
| EP | 1039683 B1 | 3/2002 |
| EP | 1043861 | 6/2002 |
| EP | 1265411 A1 | 12/2002 |
| EP | 1286491 | 2/2003 |
| EP | 1 432 261 A1 | 6/2004 |
| EP | 1513272 A1 | 3/2005 |
| EP | 1919152 A2 | 5/2008 |
| GB | 2350753 A | 12/2000 |
| JP | 04127738 | 4/1992 |
| JP | 04367135 | 12/1992 |
| JP | 07327248 | 12/1995 |
| JP | 09233047 | 9/1997 |
| JP | 9266466 A | 10/1997 |
| JP | 10336159 A | 12/1998 |
| JP | 11113049 A | 4/1999 |
| JP | 11261623 A | 9/1999 |
| JP | 11331121 A | 11/1999 |
| JP | 11346203 A | 12/1999 |
| JP | 2000013353 A | 1/2000 |
| JP | 2000111631 A | 4/2000 |
| JP | 2000504908 T | 4/2000 |
| JP | 2000201134 A | 7/2000 |
| JP | 2000252947 A | 9/2000 |
| JP | 2001036497 A | 2/2001 |
| JP | 2002111624 A | 4/2002 |
| JP | 2002111631 A | 4/2002 |
| JP | 2002152167 A | 5/2002 |
| JP | 2002152169 A | 5/2002 |
| JP | 2002158631 A | 5/2002 |
| JP | 2002514368 A | 5/2002 |

OTHER PUBLICATIONS

Elkashlan M. et al, Performance of Frequency-Hopping Multicarrier CDMA on a Uplink with Conference Proceedings, San Francisco, CA Dec. 1-5, 2003, IEEE Global Telecommunications Conference, NY, NY, IEEE, US, vol. 7 of 7, Dec. 1, 2003, pp. 3407-3411.

Gromakov, Ju. A., "Standards and Systems of Mobile Communications (Mobile Radio Communication Standards and Systems)" Moscow: Mobilnye Telesistemy—Eko Trands, 1997, pp. 59-61.

Hui Won Je et al, "A Novel Multiple Access Scheme for Uplink Cellular Systems 1," Vehicular Technology Conference, 2004, VTC2004-fall, 2004 IEEE 60th Los Angeles, CA, US, Sep. 26-29, 2004, Piscataway, NY, pp. 984-988.

International Search Report and Written Opinion—PCT/US2005/046804, International Search Authority—European Patent Office—Jul. 17, 2006.

Tonello A.M. et al. "An Asynchronous Multitone Multiuser Air Interface for High-speed Uplink Communications," Vehicular Technology Conference, 2003, VTC 2003 Fall, 2003 IEEE 58th, Orlando, FL, US Oct. 6-9, 2003, Piscataway, NJ, US, IEEE, US.

Van De Beek, et al., "On Channel Estimation in OFDM Systems," Proceedings of Vehicular Technology Conference (1995), vol. 2, pp. 815-819, Chicago, USA.

IEEE Communications Magazine, Apr. 2002, David Falconer et al., Frequency Domain Equalization for Single-Carrier Broadband Wireless Systems.

Technical Specification Group Radio Access Network: "3GGP TR25.848 V4.0.0 Physical layer aspects of UTRA High Speed Downlink Packet Access (Release 4)" 3GPP TR 25.848 V4.0.0, May 4, 2001, pp. 1-82, XP002189517 pp. 8, 38, and 50.

Kapoor, S. et al., "Pilot assisted synchronization for wireless OFDM systems over fast time varying fading channels," Proceedings of the 48th Vehicular Technology Conference (VTC '98). Ottawa, Canada, May 18, 1998, vol. 3, pp. 2077-2080.

Van der Beek, J-J et al.: "A Time and Frequency Synchronization Scheme for Multiuser OFDM," IEEE Journal of Selected Areas in Communications, vol. 17, No. 11, pp. 1900-1914, Nov. 1, 1999.

Yasunori, M. et al.: "A Study on Adaptive Uplink Resource Control Scheme for Asymmetric Packet Radio Communication Systems using OFDMA/TDD Technique," IEICE Technical Report, vol. 100, No. 435 RCS 2000-172 (Abstract), pp. 63-70, Nov. 10, 2000.

Zhongren Cao et al., "Analysis of two receiver schemes for interleaved OFDMA uplink," Signals, Systems and Computers, 2002. Conference Record of the Thirty-Sixth Asilomar Conference on, Nov. 3, 2002, vol. 2, pp. 1818-1821.

Taiwan Search Report—TW093113201—TIPO—Apr. 26, 2011.

Miller, L. et al., "Cumulative acknowledgement multicast repetition policy for wireless LANs or ad hoc network clusters," IEEE, Wireless Communication Technologies Group National Institute of Standards and Technology, Maryland Gaithersburg, pp. 3403-3407, (2002).

Miyoshi, M. et al., "Performance Improvement of TCP in wireless cellular network based acknowledgement control", Department of Infomatics and Mathematical Secience, Gradute School of Engineering Science, Osaka University, Japan, Proceedings of the 7th Asia Pacific, pp. 1-15, (2001).

Coleri, S. et al: "Channel Estimation Techniques Based on Pilot Arrangement in OFDM Systems," IEEE Transactions on Broadcasting, Sep. 1, 2002, pp. 223-229, vol. 48, No. 3, IEEE Service Center, XP011070267, ISSN: 0018-9316.

Zhao et al., "A novel channel estimation method for OFDM mobile communication systems based on pilot signals and transform-domain processing" Vehicular Technology Conference, 1997, IEEE 47th Phoenix, AZ, USA May 4-7, 1997, New York, NY, USA, IEEE, US, vol. 3, May 4, 1997, pp. 2089-2093, XP010229166 ISBN: 0-7803-3659-3.

* cited by examiner

METHOD OF USING SHARED RESOURCES IN A COMMUNICATION SYSTEM

REFERENCE TO CO-PENDING APPLICATIONS FOR PATENT

This application is related to the following co-pending U.S. patent applications: U.S. application Ser. No. 10/340,507, filed on Jan. 10, 2003 and U.S. application Ser. No. 10/426, 546, filed on Apr. 29, 2003, both assigned to the assignee hereof, and expressly incorporated herein by reference.

FIELD OF INVENTION

The present invention relates generally to communication and more specifically to techniques for transmitting data on a shared channel.

BACKGROUND

Wireless communication systems are widely deployed to provide various types of communication such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Typically, a wireless communication system comprises several base stations, wherein each base station communicates with the mobile station using a forward link and each mobile station communicates with base station using a reverse link.

In the communication system described above, mobile station makes a resource assignment request to the base station. In response, the base station assigns the requested resource, if available, and provides the assignment information using a communication channel. Typically, the mobile stations are assigned a forward link data channel resources via an assignment messages that is transmitted over a designated channel.

Most of the communication system described above use a forward link and a reverse link in conjunction with a Hybrid Automatic Repeat Request (H-ARQ) scheme to communicate data and other information. H-ARQ techniques have been shown to provide significant improvement in capacity. With Hybrid ARQ, a packet is sent using multiple transmissions. The packet transmission could be terminated early if the receiver can decode the packet prior to receiving all the transmission. However, when there is large number of mobile stations requesting resource assignments, the number of transmissions increases when using H-ARQ. In order to ensure that assignment information is received timely, the base station would have to increase the bandwidth, lower the number of transmissions, requiring additional signaling information or not use H-ARQ.

Several methods have been employed in order maintain bandwidth and use H-ARQ, such as a multicast system. In a typical multicast system, assignment information is broadcasted over a shared channel all the mobile stations in communication with the base stations, thereby eliminating use of a dedicated resource to provide the assignment information. However, this solution creates heavy computational burden on the mobile station, since every mobile must attempt to decode every transmitted frame.

Thus, there is a need for a system and method of managing the dedicated and share resources that allows transmission of assignment or other data packets to multiple mobile stations.

BRIEF SUMMARY

Accordingly, an apparatus and method of delivering data in a wireless communication system, the apparatus and method comprising of determining, based on first criterion, if a shared channel can be utilized to transmit an actual data packet; converting said actual data packet into one or more first data packets, wherein each said one or more first data packet represent a portion of said actual data packet; and transmitting each said one or more first data packet using said shared channel.

A more complete appreciation of all the advantages and scope of the invention can be obtained from the accompanying drawings, the description and the appended claims.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a terminal is receiving and processing data received on a given channel.

Figure 1:
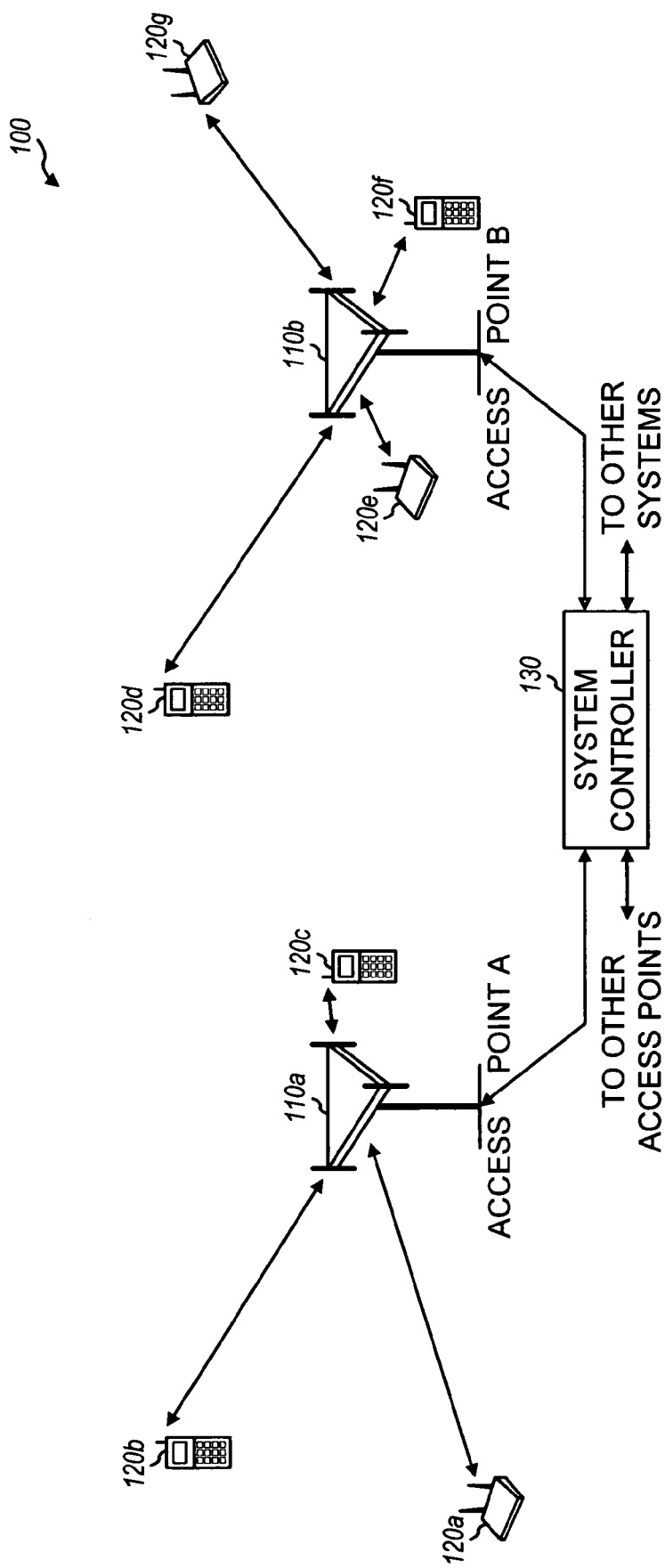
FIG. 1 shows a diagram of a wireless multiple-access communication system.

FIG. 1 shows a diagram of a wireless multiple-access communication system 100 that employs multi-carrier modulation. System 100 includes a number of access points (AP) 110 that communicate with one or more access terminal (AT) 120 (only two access points 110a and 110b are shown in FIG. 1 for simplicity). An access point 110 (110 is further discussed in FIG. 6, infra) is a fixed station that is used for communicating with the access terminals. An access point 110 may also be referred to as a base station or some other terminology.

An access point (AP), for example access point 110, is an electronic device configured to communicate with one or more user access terminals and may also be referred to as an access node, access network, a base station, base terminal, fixed terminal, a fixed station, base station controller, a controller, transmitter or some other terminology. The access point, base terminal, and base station are interchangeably used in the description below. The access point may be a general purpose computer, a standard laptop, a fixed terminal, an electronic device configured to transmit, receive and process data according to air interface methods defined by an OFDMA, CDMA, GSM, WCDMA, etc. system. The access point may be an electronic module comprising one or more computer chips controlled by a controller or a processor for transmitting, receiving and processing data according to air interface methods defined by an OFDMA, CDMA, GSM, WCDMA, etc.

An access terminal the access terminal 120, may be an electronic device configured to communicate with the access point via a communication link. The access terminal may also be referred to as an terminal, a user terminal, a remote station, a mobile station, a wireless communication device, recipient terminal, or some other terminology. The access terminal, mobile terminal, user terminal, terminal are interchangeably used in the description below. Each access terminal 120 may communicate with one or multiple access points on the downlink and/or uplink at any given moment. The downlink (i.e., forward link) refers to transmission from the access point to the access terminal 120, and the uplink (i.e., reverse link) refers to transmission from the access terminal 120 to the access point. The access terminal 120 may be any standard laptop, personal electronic organizer or assistant, a mobile phone, cellular phone, an electronic device configured to transmit, receive and process data according to air interface methods defined by an OFDMA, CDMA, GSM, WCDMA, etc. system. The access terminal may be an electronic module comprising one or more computer chips controlled by a controller or a processor for transmitting, receiving and processing data according to air interface methods defined by an OFDMA, CDMA, GSM, WCDMA, etc. system.

A system controller 130 couples to the access points and may further couple to other systems/networks (e.g., a packet data network). System controller 130 provides coordination and control for the access points coupled to it. Via the access points, system controller 130 further controls the routing of data among the terminals, and between the terminals and other users coupled to the other systems/networks.

The techniques described herein for managing the transmission using the shared channel may be implemented in various wireless multiple-access multi-carrier communication systems. For example, system 100 may be an OFDMA, CDMA, GSM, WCDMA, etc. system that utilizes data transmission.

For clarity, these techniques are described for an OFDMA system that utilizes orthogonal frequency division multiplexing (OFDM). OFDM effectively partitions the overall system bandwidth into a number of n orthogonal frequency subcarriers, which are referred to as tones, sub-bands, bins, frequency channels, and so on.

In an OFDMA system, a superframe is used which is the fundamental unit of transmission on the forward and reverse links that defines a time interval. A forward link (FL) superframe is used to transmit information from the access point 110 to THE ACCESS TERMINAL 120. FL superframe is further discussed below in FIG. 2. In an embodiment, on the forward link, a superframe consists of a preamble of 6 OFDM symbols followed by a series of 6 forward link PHY frames. The OFDM symbol is comprised of n individually modulated subcarriers, which carry complex-valued data, where n is computed as a function of the system bandwidth. Generally, the superframe is multiplexed in time (OFDM symbol) and frequency (subcarrier).

In the OFDMA system, multiple orthogonal "traffic" channel may be defined whereby (1) each subcarrier is used for only one traffic channel in any given time interval and (2) each traffic channel may be assigned zero, one, or multiple subcarriers in each time interval.

Figure 2:
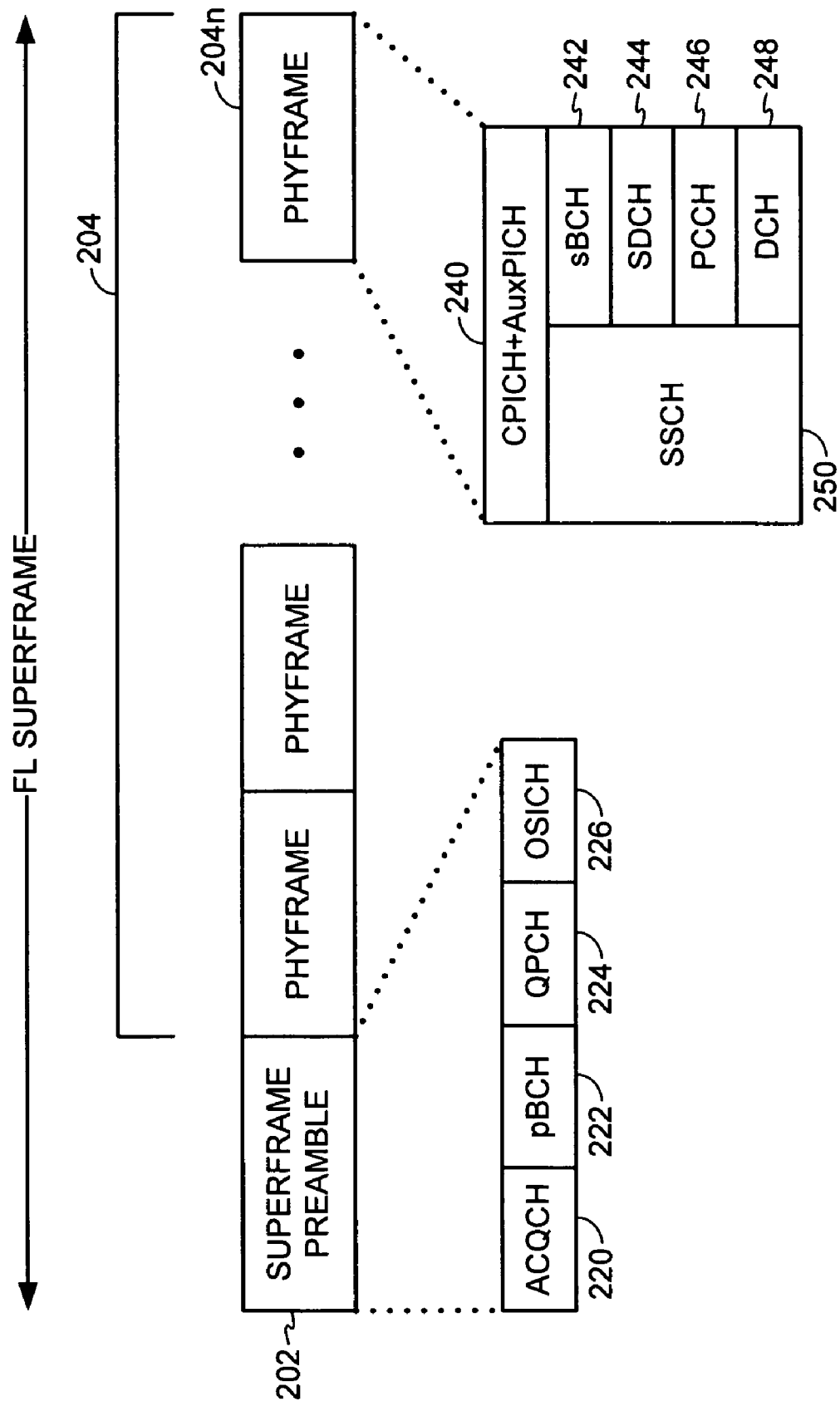
FIG. 2 illustrates a superframe structure.

FIG. 2 illustrates a frame structure 200 for a forward link superframe of OFDMA system according to an embodiment.

The forward link superframe 200 comprises a superframe preamble portion 202 followed by 6 PHY Frames portion 204. The superframe preamble portion 202 comprises a plurality of orthogonal channels, an Acquisition Channel (AC-QCH) 220, a Primary Broadcast Channel (PBCH) 222 (also referred to an SYNC channel), a Quick Paging Channel (QPCH) 224, and an Other Sector Interference Channel (OS-ICH) 226. Each PHY frame (for example 204n) of the PHY frame portion 204 comprises a plurality of physical channels, a pilot one or more pilot channel 240 (for example a Common Pilot Channel (CPICH). Also, if present, an Auxiliary Pilot Channel (AuxPICH)), a Shared Signaling Channel (SSCH) 250, a Data Channel (DCH) 248, a Secondary Broadcast Channel (sBCH) 242, a Shared Data Channel (SDCH) 244 and a Power Control Channel (PCCH) 246.

Figure 3:
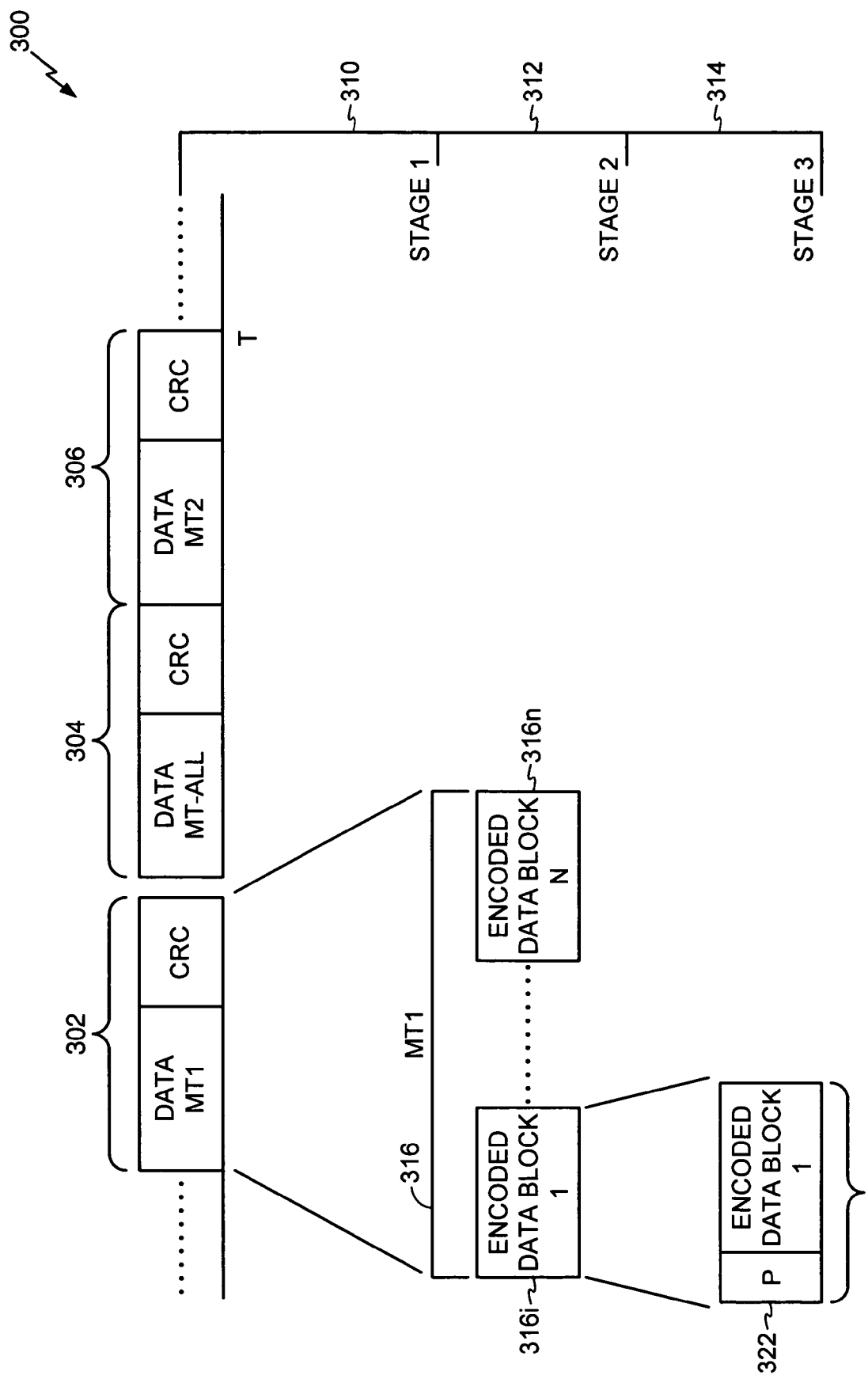
FIG. 3 illustrates a data packet conversion diagram.

FIG. 3 illustrates a data packet conversion diagram 300 which shows the conversion of an actual data packet, according to an embodiment. In an embodiment, the data packet may be converted to form TX data packets using one or more stages, a first stage 310, a second stage 312 and a third stage 314, described below.

During a first stage 310, for an intended recipient receiving an assignment, the data packet comprising the assignment is encrypted to form an encrypted data block. For example, encrypted data block 302 for MT1 (targeted or intended for terminal 1), encrypted data block 304 for MT-ALL (targeted or intended for all the terminals), encrypted data block 306 for MT2 (targeted or intended for terminal 2), and so on.

During a second stage 312, each encrypted data block, for example 302, is further split or divided to form an encoded data block series 316 (also referred to as "series") comprising a plurality of equal sized encoded data block 316i through 316n, wherein i represents the first encoded data block and n represents number of retransmissions to be used. The n value of may be determined by bandwidth available and/or number of access terminals requesting information from the access point 110. More the users requesting information from AN, the lower the value of n.

During a third stage 314, a prefix 322 (also refer to as a preamble) portion may be added to the encoded data block 316i to form a TX data packet 324. The prefix 322 may be added to the first encoded data block 316i of the encoded data block series 316 and not the remaining encoded data blocks. The prefix 322 comprises one or more information bits. The information bit(s) providing a format of the packet, the access terminal 120 identification, modulation or any other information controller determines necessary for effective demodulation of the TX data packet 324. In another embodiment, the prefix 322 is added to all the encoded data blocks of the encoded data block series 316. Also, in another embodiment, the access point 110 may use only the first and second stages 310 and 312 to convert the actual data packet. This is generally performed by not attaching the prefix 322 to any of the encoded data blocks of the series 316. (e.g., the length of the prefix 322 would be zero for the TX data packet 324).

In an OFDMA system, the access point 110 determines if the SDCH 244 resource should be used to transmit the channel assignments. Generally, the SDCH 244 does not required pre-assignment of resources in order to received data and all terminals process this channel. Using the techniques described below, the access point 110 may transmit data targeted to an intended access terminal 120 using scheduler 630 and controller 620 that constantly monitors the system conditions and make proper adjustments as necessary. For example, the access point 110 checks to see whether the number of encoded data blocks to transmit on SSCH have reached a capacity threshold (a maximum number of encoded data blocks allowable to be queued). The capacity threshold may be dynamically adjusted by the controller 620. If the total number of queued encoded data blocks reach the threshold, then the access point 110 may decide to start utilizing the shared resources, such as the SDCH 244 to transmit data, for example the access terminal 120 assignment data.

Figure 4:
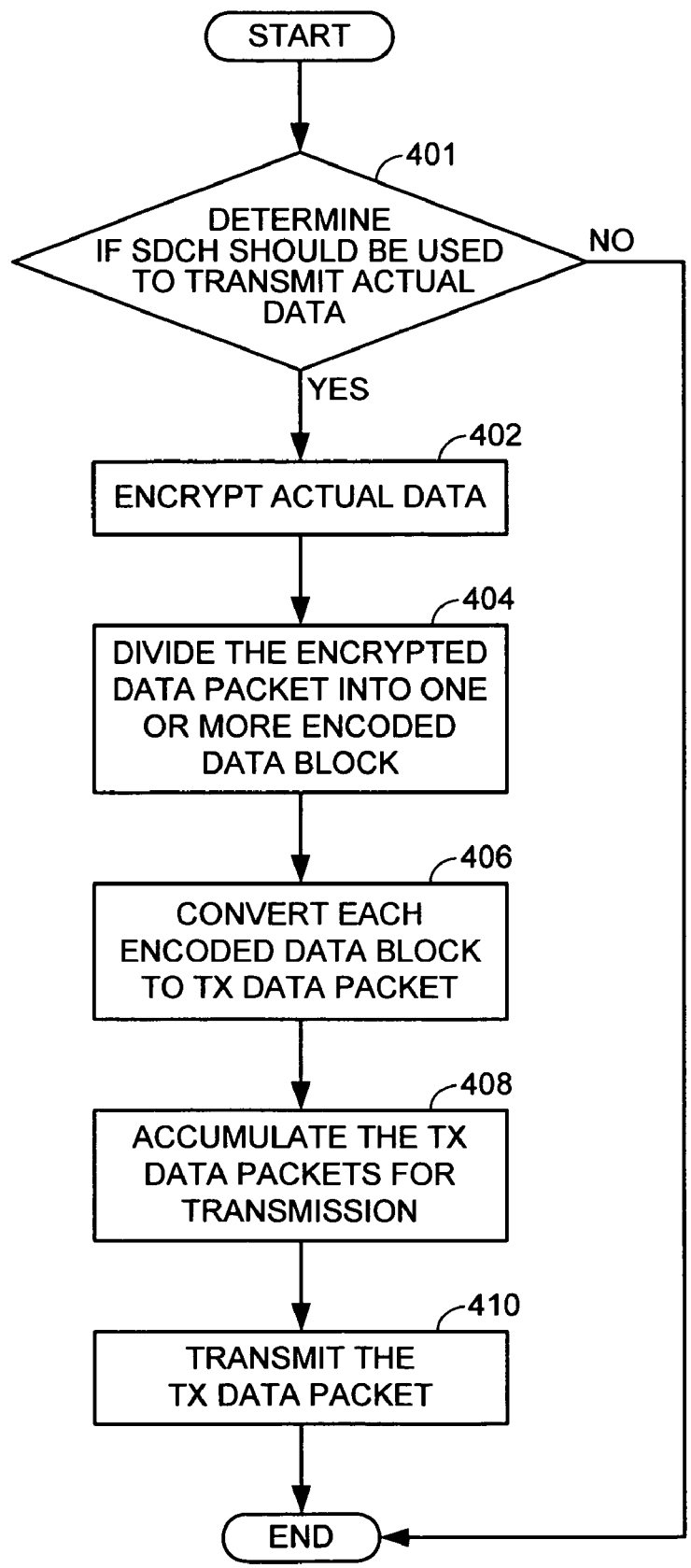
FIG. 4 shows a flow diagram of an embodiment of a process to transmit data to using the shared channel.

FIG. 4 shows a flow diagram of a process 400 used to convert the actual data packet into one or more transmittable data packets using the shared channel SDCH 244, when used. The steps of the process 400 are executed by the access point 110. The access point 110 is configured to utilize at least one of the components discussed in FIG. 6, infra. For example, the controller 620, scheduler 630, TX Data Processor 614, etc. are used to execute the steps of the process 400. At step 401, as discussed above, the access point 110 determines if SDCH 244, or any shared recourses, should be used to transmit actual data (for example, data representing the forward link assignment message for an access terminal 120). At step 402, the access point 110 encrypts the actual data, to form encrypted data packet 302. At step 404, the access point 110 divides the encrypted data packet 302 to generate an encoded data block series 316 comprising one or more encoded data block 316i-n. The number of encoded data blocks generated may vary depending on, for example, quality of service (QOS) desired by the system operator, or any other quality measurements determined by the access point 110.

At step 406, the access point 110 converts each encoded data blocks of series 316 to the TX data packet. In an embodiment, for example, the access point 110 determines the information to include in the prefix 322 and attaches the prefix 322 only to the first encoded data blocks of series 316 when converting the encoded data block 316i=1 to TX data packet 324. In another embodiment, the access point 110 attaches a prefix 322 to all the encoded data blocks of series 316.

In another embodiment, none of the encoded data blocks of the series 316 have the prefix 322 (e.g. the TX data packets are the same as the encoded data blocks). Thus, in this embodiment, the access point 110 is not required to execute step 406. Alternatively, the access point 110 may set the length of the prefix 322 to zero.

At step 408, the access point 110 accumulates the TX data packets for transmission on a frame by frame basis according to rule of a scheme used. For example, a first scheme that requires an ACK before the next TX data packet is transmitted or an interlace transmission scheme that requires delaying transmission by one or more frame before transmitting the next TX data packet. At step 410, the access point 110 transmits all the TX data packets, stored in step 408, one per frame on the SDCH 244. The step 410 is repeated until all the TX data packets, stored in memory are transmitted.

Figure 5B:
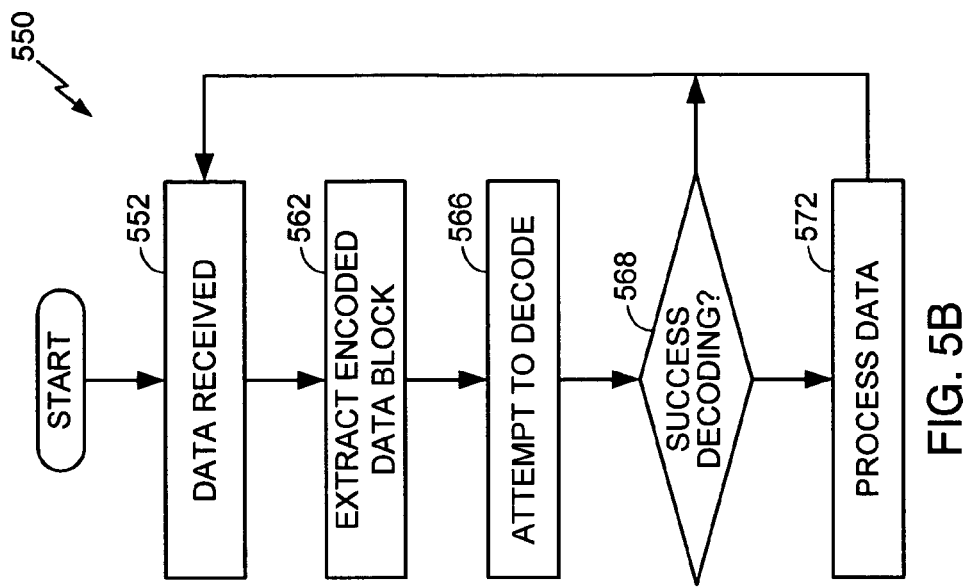
FIGS. 5A and 5B shows a process for evaluating data received on the shared channel.
Figure 5A:
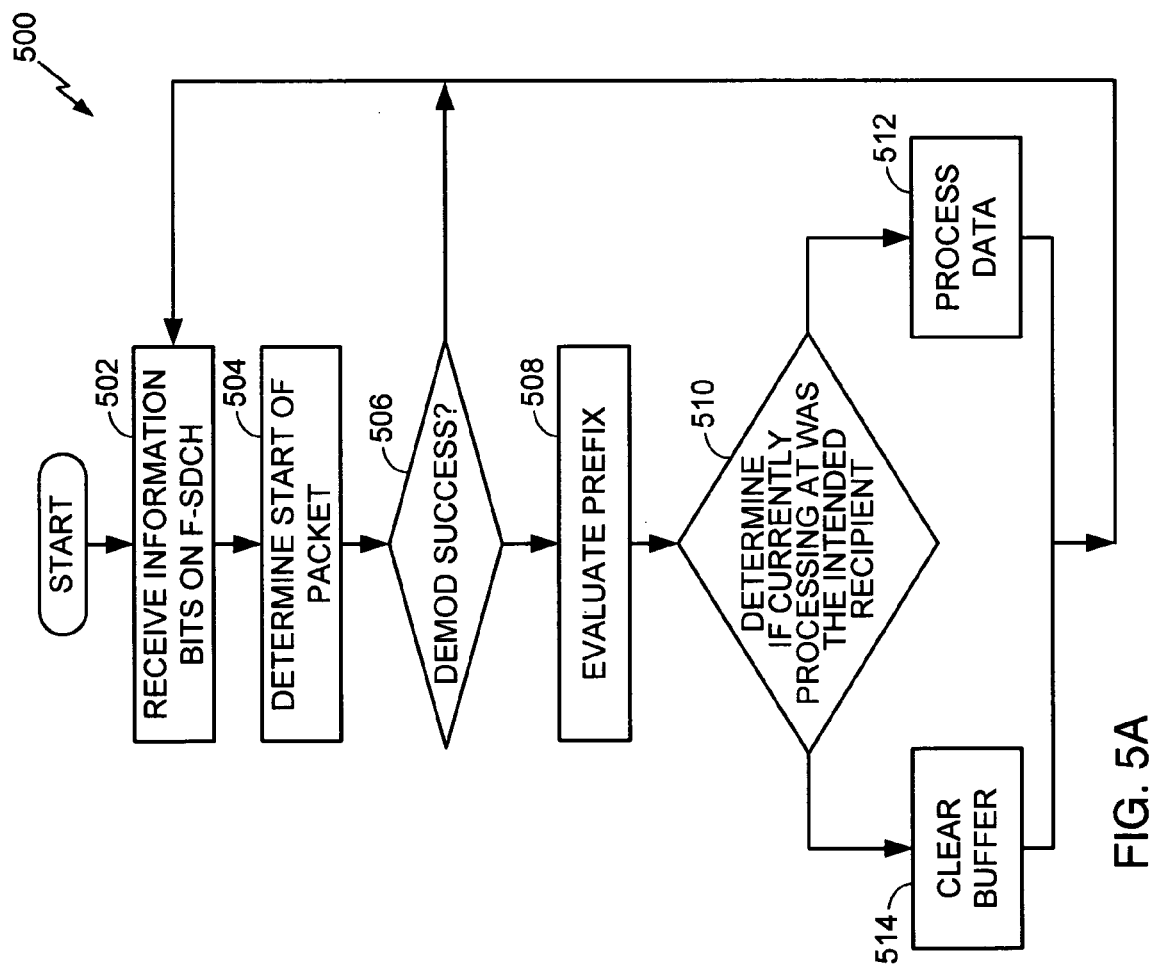

FIG. 5A shows a process 500 for evaluating data received on the shared channel SDCH 244 according to an embodiment. The steps of the process 500 are executed by the access terminal 120, wherein the access terminal 120 is configured to use one or more components discussed in FIG. 6, for example, the controller 660, RX Data Processor 656, TX Data Processor 674, etc. described below. Generally, information bits are continuously received on the shared channel SDCH 244. At step 502, the access terminal 120 receives information bits on SDCH 244. In an embodiment, at step 504, the access terminal 120 samples the received information and determines start of packet (e.g., the TX data packet associated with the first encoded data block of series 316). The access terminal 120 samples information bits, wherein the number information bits sampled is the size of prefix 322 and attempts to demodulate the sampled information bits using demodulation parameters. The demodulation parameters may be provided using various schemes, for example the demodulation parameters may have been provided when the access terminal 120 registered with the access point 110. At step 506, if the demodulation of the prefix 322 was successful, then the access terminal 120 executes step 508. Otherwise, the access terminal 120 executes step 502 to continue evaluating additional information bits.

At step 508, the demodulated data extracted from prefix 322 are evaluated. The prefix 322 may provide several types of information (one or more tags), such as access terminal identification of the access terminal 120, to indicate that the data following the prefix 322 is intended for the access terminal 120. The prefix 322 may comprise one or more tags such as, a tag indicating how the packet was formed, a tag providing an indication of length of associated data, a tag providing an indication of the modulation scheme, a tag providing an indication that encoded data block 316i is present in the, a data rate tag, and one or more miscellaneous tags that provide information about the processing of the data associated with the prefix 322.

At step 510, the access terminal 120 determines, using at least one of the tags provided in the prefix 322, if the access terminal 120 currently processing the bits was the intended recipient of the TX data packet. If so, then at step 512, the access terminal 120 processes the data associated with prefix 322 by extracting and demodulating the associated data using information provided by the prefix 322. Otherwise, at step 514, the access terminal 120 clears the data buffers and new information bits are sampled at step 502. The information extracted from prefix 322 may be stored and later used for extracting and demodulating those TX data packets that do not have a prefix 322.

FIG. 5B shows a process 550 for evaluating data received on the SDCH 244 according to another embodiment. The process 550 may be executed as a parallel process to process 500, wherein the process 550 is processing information bits received on a second shared channel (not shown). The process 550 may also be executed by the access terminal 120 whenever the access point 110 is transmitting TX data packets without a prefix 322. As stated above, generally, information bits are continuously received on the shared channel, at step 552. At step 562, the access terminal 120 samples received information. The sample size of the information bits is the size of the TX data packets. The size of TX data packets may be pre-stored in memory 662 or provided prior to the execution of step 552. After sampling the data, the access terminal 120 attempts to demodulate (or decodes) sampled information to using demodulation information, such as packet size and/or demodulation parameters, to demodulate TX data packets. The demodulation parameters may also be provided upon the access terminal 120 upon registering with the access point 110.

At step 566, the access terminal 120 attempts to decode the extracted encoded data block. At step 568, if the attempted decoding is successful, then the access terminal 120 execute step 572 and processes the data.

In another embodiment, if the system is capable of using two shared channels SDCHs, both, transmit process 300 and 400) and receive (process 500 and 550) techniques discussed above, may be employed concurrently. One shared channel may transmit data encoded with a prefix 322, thus allowing smaller sampling and the second channel may transmit blocks of fixed sizes, thus allowing quicker processing, especially for broadcast to large group of users.

Figure 6:
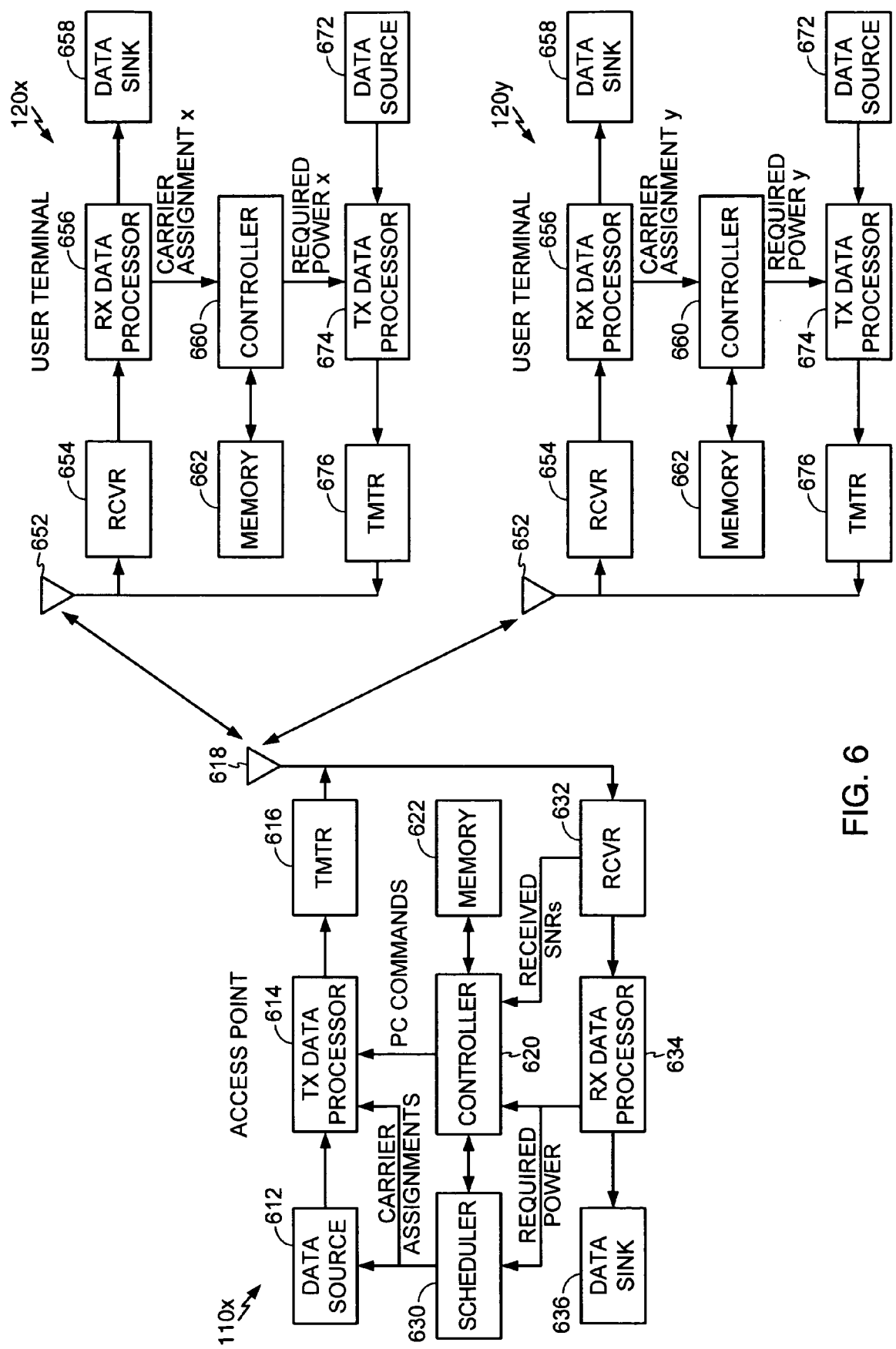
FIG. 6 show block diagrams of a base station and a terminal, respectively, in the OFDMA system.

FIG. 6 shows a block diagram of an embodiment of an access point 110x and two terminals 120x and 120y in multiple-access multi-carrier communication system 100. At access point 110*x*, a transmit (TX) data processor 614 receives traffic data (i.e., information bits) from a data source 612 and signaling and other information from a controller 620 and a scheduler 630. For example, controller 620 may execute the steps of process 400, and scheduler 630 may provide assignments of carriers for the access terminals. These various types of data may be sent on different transport channels. TX data processor 614 encodes and modulates the received data using multi-carrier modulation (e.g., OFDM) to provide modulated data (e.g., OFDM symbols). A transmitter unit (TMTR) 616 then processes the modulated data to generate a downlink modulated signal that is then transmitted from an antenna 618.

At each of terminals 120*x* and 120*y*, the transmitted and modulated signal is received by an antenna 652 and provided to a receiver unit (RCVR) 654. Receiver unit 654 processes and digitizes the received signal to provide samples. A received (RX) data processor 656 then demodulates and decodes the samples to provide decoded data, which may include recovered traffic data, messages, signaling, and so on. The traffic data may be provided to a data sink 658, and the carrier assignment and PC commands sent for the terminal are provided to a controller 660.

Controller 660 directs data transmission on the uplink using the specific carriers that have been assigned to the terminal and indicated in the received carrier assignment. In an embodiment, the controller 660 executes the steps of process 500 and 550.

For each active terminal 120, a TX data processor 674 receives traffic data from a data source 672 and signaling and other information from controller 660. For example, controller 660 may provide information indicative of the required transmit power, the maximum transmit power, or the difference between the maximum and required transmit powers for the terminal. The various types of data are coded and modulated by TX data processor 674 using the assigned carriers and further processed by a transmitter unit 676 to generate an uplink modulated signal that is then transmitted from antenna 652.

At access point 110*x*, the transmitted and modulated signals from the terminals are received by antenna 618, processed by a receiver unit 632, and demodulated and decoded by an RX data processor 634. Receiver unit 632 may estimate the received signal quality (e.g., the received signal-to-noise ratio (SNR)) for each terminal and provide this information to controller 620. Controller 620 may then derive the PC commands for each terminal such that the received signal quality for the terminal is maintained within an acceptable range. RX data processor 634 provides the recovered feedback information (e.g., the required transmit power) for each terminal to controller 620 and scheduler 630.

Scheduler 630 uses the feedback information to perform a number of functions such as (1) selecting a set of terminals for data transmission on the reverse link and (2) assigning carriers to the selected terminals. The carrier assignments for the scheduled terminals are then transmitted on the forward link to these terminals.

The techniques described herein may be implemented by various means. For example, these techniques may be implemented in hardware, software, or a combination thereof. For a hardware implementation, the processing units (e.g., controllers 620 and 670, TX and RX processors 614 and 634, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units (e.g., memory 622 in FIG. 6) and executed by processors (e.g., controllers 620). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for delivering data in a wireless communication system, comprising:
   determining whether a shared data channel (SDCH) should be utilized to transmit channel assignment data that would otherwise be transmitted via a shared signaling channel (SSCH), based on whether a capacity threshold of an SSCH transmission queue is reached;
   converting the channel assignment data into one or more data packets having a format suitable for transmission on the SDCH, and attaching a prefix to at least one of the one or more data packets, wherein each of the one or more data packets includes a portion of the channel assignment data; and
   transmitting each of the one or more data packets, including the prefixes of the one or more data packets, utilizing the SDCH.

2. The method of claim 1, wherein the converting the channel assignment data into the one or more first data packets further comprises dividing the channel assignment data into a series of encoded data blocks.

3. The method of claim 1, wherein the transmitting each of the one or more data packets further comprises transmitting each of the one or more data packets using an interlaced transmission scheme.

4. The method of claim 1, further comprising concurrently transmitting packet data of a fixed length on the SSCH.

5. A method for receiving data in a wireless communication system, comprising:
   receiving a plurality of information bits over a shared data channel (SDCH) in response to a remote determination that the SDCH should be used to transmit channel assignment data that would otherwise be transmitted via a shared signaling channel (SSCH), based on determining whether a capacity threshold of an SSCH transmit queue is reached;
   determining if at least one packet of the channel assignment data is contained in the information bits;
   extracting a first portion and a prefix portion from the packet of the channel assignment data; and processing the information contained in the first portion based at least in part on the prefix portion.

6. The method of claim 5, further comprising concurrently receiving packet data of a fixed length on the SSCH.

7. In a wireless communication system, an apparatus comprising:
an electronic device configured to determine if a shared data channel (SDCH) should be used to transmit channel assignment data that would otherwise be transmitted via a shared signaling channel (SSCH), based at least in part on whether a capacity threshold of an SSCH transmission queue is reached, to convert the channel assignment data into one or more data packets, to attach a prefix to at least one of the data packets, and to transmit each of the one or more data packets and respective prefixes utilizing the SDCH,
wherein each of the one or more data packets includes a portion of the channel assignment data.

8. The apparatus of claim 7, wherein the electronic device is further configured to divide the channel assignment data into a series of encoded data blocks.

9. The apparatus of claim 7, wherein the electronic device is further configured to transmit each of the one or more first data packets using an interlaced transmission scheme.

10. The apparatus of claim 7, wherein the electronic device is further configured to concurrently transmit packet data of a fixed length on the SSCH.

11. In a wireless communication system, an apparatus comprising:
an electronic device configured to receive a plurality of information bits via a shared data channel (SDCH) in response to a remote determination that the SDCH should be used to transmit channel assignment data that would otherwise be transmitted via a shared signaling channel (SSCH), based on whether a capacity threshold of an SSCH transmission queue is reached, to determine if at least one packet of the channel assignment data is contained in the information bits, to extract a first portion and a prefix portion from the packet of the channel assignment data, and to use the information contained in the prefix portion to process the first portion.

12. The apparatus of claim 11, wherein the electronic device is further configured to concurrently receive packet data of a fixed length on the SSCH.

13. An apparatus for delivering data in a wireless communication system, comprising:
means for determining, based on whether a capacity threshold of a shared signaling channel (SSCH) transmission queue is reached, if a shared data channel (SDCH) should be utilized to transmit channel assignment data that would otherwise be transmitted via the SSCH;
means for converting the channel assignment data into one or more data packets and attaching a prefix to at least one of the data packets, wherein each of the one or more data packets includes a portion of the channel assignment data; and
means for transmitting the at least one or more data packets, including any of the prefixes, using the SDCH.

14. The apparatus of claim 13, wherein the means for converting further comprises means for dividing the channel assignment data into a set of encoded data blocks.

15. The apparatus of claim 13, wherein the means for transmitting further comprises means for transmitting each of the one or more data packets using an interlaced transmission scheme.

16. The apparatus of claim 13, further comprising means for concurrently transmitting packet data of a fixed length on the SSCH.

17. An apparatus for receiving data in a wireless communication system, comprising:
means for receiving a plurality of information bits over a shared data channel (SDCH) in response to a remote determination that the SDCH should be used to transmit channel assignment data that would otherwise be transmitted via a shared signaling channel (SSCH), based on whether a capacity threshold of an SSCH transmission queue is reached;
means for determining if at least one packet of the channel assignment data is contained in the information bits;
means for extracting a first portion and a prefix portion from the packet of the channel assignment data; and
means for processing the information contained in the first portion based at least in part on the prefix portion.

18. The apparatus of claim 17, further comprising means for concurrently receiving packet data of a fixed length on the SSCH.

19. A non-transitory machine-readable medium comprising instructions which, when executed by a machine, cause the machine to perform operations including:
determining, based on whether a capacity threshold of a shared signaling channel (SSCH) transmit queue is reached, if a shared data channel (SDCH) should be utilized to transmit channel assignment data that would otherwise be transmitted via the SSCH;
converting the channel assignment data into one or more data packets and attaching a prefix to at least one of the data packets, wherein each of the one or more data packets represent a portion of the channel assignment data; and
transmitting each of the one or more data packets, along with the attached prefixes, using the SDCH.

20. The non-transitory machine-readable medium of claim 19, further comprising instructions which, when executed by the machine, cause the machine to concurrently transmit packet data of a fixed length on the SSCH.

21. A non-transitory machine-readable medium comprising instructions which, when executed by a machine, cause the machine to perform operations including:
receiving a plurality of information bits over a shared data channel (SDCH) in response to a remote determination that the SDCH should be used to transmit channel assignment data that would otherwise be transmitted via a shared signaling data channel (SSCH), based on whether a capacity threshold of an SSCH transmit queue is reached;
determining if at least one packet of the channel assignment data is contained in the information bits;
extracting a first portion and a prefix portion from the packet of the channel assignment data; and
processing the information contained in the first portion based at least in part on the prefix portion.

22. The non-transitory machine-readable medium of claim 21, further comprising instructions which, when executed by the machine, cause the machine to concurrently receive packet data of a fixed length on the SSCH.

* * * * *